May 11, 1965  R. G. COWEN  3,183,499
HIGH DIRECTIVITY SOLID CURTAIN PERIMETER INTRUSION SYSTEM
Filed July 3, 1963  2 Sheets-Sheet 1

INVENTOR.
Richard G. Cowen
BY
ATTORNEY.

May 11, 1965  R. G. COWEN  3,183,499
HIGH DIRECTIVITY SOLID CURTAIN PERIMETER INTRUSION SYSTEM
Filed July 3, 1963  2 Sheets-Sheet 2

INVENTOR.
Richard G. Cowen
BY
ATTORNEY.

United States Patent Office 3,183,499
Patented May 11, 1965

3,183,499
HIGH DIRECTIVITY SOLID CURTAIN PERIMETER INTRUSION SYSTEM
Richard G. Cowen, Frederick, Md., assignor to the United States of America as represented by the United States Atomic Energy Commission
Filed July 3, 1963, Ser. No. 292,808
14 Claims. (Cl. 340—258)

This invention relates to improvements upon my co-pending U.S. patent application S.N. 154,374, filed November 11, 1961. More particularly, this invention relates to an inexpensive protective system which detects the interruption of a portion or all of a plane or curtain of radiant energy by either relatively large or small objects.

Protective systems of the prior art are expensive and to some extent their effectiveness against intrusion can be negated by a person who understands their principle of operation. In one common system, expensive lenses direct a source of light on to a photocell; an individual may defeat the purpose of such a system by directing a flashlight against the photocell so that this intrusion goes undetected. In other systems, a room is flooded with omni-direction radiant energy and detection is based upon the intruder disturbing the radiant energy pattern throughout the room; it is obvious that the intruder disturbs only a small portion of the radiant energy pattern in the room while a large portion of the energy still reaches the detector, hence the detector must be extremely sensitive. It is also obvious that the more sensitive the detector required to detect an intruder, the more sensitive it is to changes in ambient radiation and temperature changes as well as to voltage variations; thus such systems are extremely critical and subject to false alarms.

In addition, some prior systems in order to detect intrusion require a substantially complete interruption of the light beam and will not adequately detect intrusion by a relatively small or thin object which interrupts only a portion of the light such as a fishing pole which may be used to appropriate objects from a room without an individual intruding person actually entering the door or window of the room.

If it is desired to protect a room or building against intrusion, as for example against the theft of secret documents, the system must be burglar proof and non-responsive to the normal varying conditions under which it operates, such as varying temperature or voltage. In considering the protection of a room where a burglar may enter through a door or window, the system should be non-responsive to over-head lights which may be switched on and off or left in one or the other condition by employees and non-responsive to ambient light variations due to the presence of sunlight coming through the windows. This is particularly true in the present invention, in which detection is made of variations in a vertical plane of light, referred to as a curtain, from one side of the room door or window to the opposite other side of the door, room, or window. In addition, it is desirable to provide a system which is fail-safe and which in addition to detecting intrusion is continually monitoring itself.

Accordingly, it is an object of this invention to provide an improved protective system which detects intrusion through a highly directive solid curtain or plane of radiation such that the intrusion through all or only a small portion of that curtain will result in detection.

Another object is to provide a highly directive radiation protection system which is not sensitive to changes in ambient radiation such as sunlight or interior room lighting.

A further object is to provide a solid curtain radiation protective system which is not sensitive to small variations in the radiation source or electrical supply voltages but is responsive to large variations.

A still further object is to provide a highly sensitive detector system using a current meter and in which current amplification is provided by reflection of radiation from or through the needle of the meter detector onto a radiation sensitive device to operate an alarm or other indicator.

Another object is to provide a highly sensitive detector system or switching circuit accomplished by directing or reflecting radiation respectively through or from a hole or reflective coating respectively on a meter detector needle to a radiation sensitive device. Displacement of the needle in response to detection of a signal or action of a switch results in changing the radiation path from the radiation source to the radiation sensor.

The above-mentioned objects are accomplished by the several novel aspects of this invention.

The invention as one aspect includes the use of a vertically disposed elongated fluorescent or other known source of radiation such as light at one end of a room or side of a window, for example, and a multiplicity of radiation sensitive cells such as photoresistors at the other end of the room or side of the window disposed vertically generally one above the other with the cells arranged to receive radiation from distinctive portions of the source so that interruption of a portion or all of the vertically disposed plane or curtain of light between the source and the detectors is detected by at least one photoresistor.

An important further aspect of the invention is the provision of one or more elongated light conducting tubes in front of each individual radiation sensitive cell so that the only radiation received by the cells are the direct radiations from the fluorescent source for example while any indirect or ambient or spurious radiation from room or sunlight for example is absorbed or not transmitted by the tube and accordingly not detected.

Another aspect is the design of the detector including the light conducting tubes and light sensitive devices so that for any desired distance between the source and the detector, the diameter and length of the light conducting tubes are designed to conduct direct radiation from individually different selected adjacent portions of the light source defined by a very small angle between the light conducting tube and the selected portion while attenuating any spurious light entering the light tube at a greater angle.

A still further aspect of the invention is that all of the light detecting cells are arranged in a bridge circuit with cells in each arm of the bridge and a meter or other current detector across the bridge so that an interruption of only a portion of the light curtain results in an alarm. In another aspect, the resulting meter needle movement is amplified by permitting the meter needle to control the deflection of a further or the same source of light onto a further light sensitive detector which controls the alarm circuit. In one particular embodiment the last mentioned light refers to a separate source while in another embodiment the last mentioned light is the fluorescent source and the meter is mounted on the same board with the detectors for receiving such light.

A further aspect of the invention relates to the detecting and alarm circuitry in which all the circuit components are in an active state to provide fail-safe operation and in which the light sensitive cells are connected in a bridge circuit with a meter connected across the bridge. In the normal or rest condition (absence of intrusion) the bridge circuit is slightly out of balance so that the meter is active with current flow, the meter needle is slightly deflected to reflect light to normally energize and make active the alarm relay whereby an intrusion which affects only one light sensitive cell will vary the meter current sufficiently to operate the alarm while small or alternating gross changes in voltage or light which affects all of the light sensitive cell equally will not operate the alarm and while large gross changes in such conditions will result in further unbalancing the meter and operate the alarm. Thus a single active meter and active relay indicate an alarm in response to a small intrusion, a large intrusion, failure of the voltage source, failure of the light source or substantial variations in the light or voltage source other than alternating variations while being non-responsive to normal slight variations in such light or voltage source.

The above and further objects are accomplished by my invention as shown in its several preferred embodiments which are described in the following description and in the following drawings of which:

Figure 1:
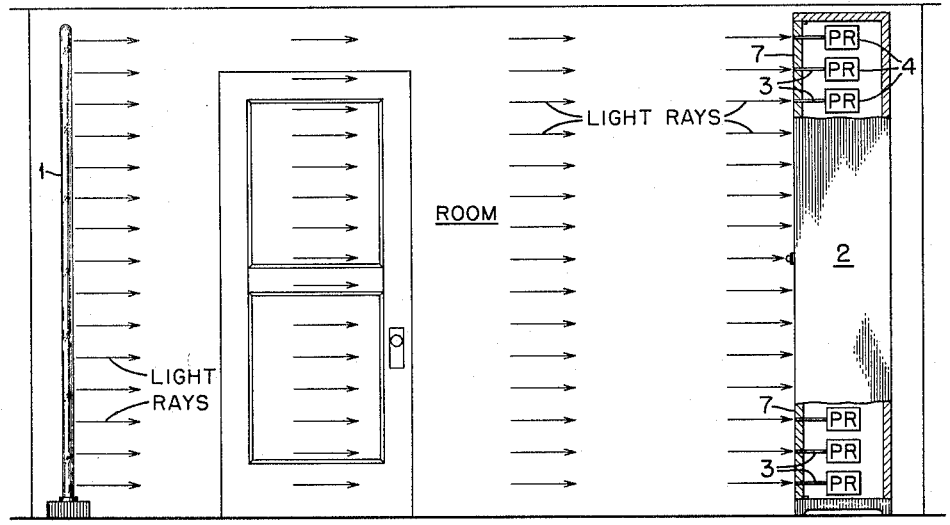
FIG. 1 shows the inside wall of a room with a vertically disposed light source and a detector assembly at the opposite end of the wall shown in partial cross section.

In reference to FIG. 1, there is shown the inside wall of a room having a door or alternatively a window through which an intrusion may occur either by entry of a person or an object controlled by the person. At one end of the room there is a vertical elongated source of short wavelength radiation, preferably an inexpensive fluorescent light tube 1 directing light rays across the room; the length of the source is substantially the height of the door or the window. The light source need not be directive since an important aspect of this invention is that the detectors are highly directive in the vertical plane parallel to the wall of the room.

The detector assembly 2 is an elongated vertical box having a front panel 7 which is perpendicular to the direction of the light rays as is more clearly shown in the two embodiments of FIGS. 1A and 1C. Within the detector assembly 2 are a multiplicity of radiation sensitive detectors 4 which are preferably light-sensitive photoresistors PR and a multiplicity of elongated light conducting means 3 to pass the horizontally-directed direct rays of the source and in the illustrated embodiment are hollow metal round tubes, although they need not be round and may be of non-metal as is well known. One end of the tubes 3 is mounted in the front face 7 of the box for receiving the radiant energy; the photoresistors 4 are suitably mounted within the box at the other end of the hollow tubes. Thus the direct light rays from source 1 which can pass down the inside of the hollow tube, will reach the photoresistor detector as will be more fully described.

The individual light conducting tubes 3 serve to pass a portion of the direct rays from source 1 which are within a very small angle defining a small vertical length or segment of the light source while attenuating all spurious or ambient light which is not within that small angle. In FIG. 1 for example, is it clear that one of the light rays from a point on source 1 will pass down a particular tube 3 which is horizontally aligned with that ray. In addition, light rays from a small longitudinal section of the light source on both sides of that point will also be capable of passing down the same tube without attenuation because the diameter of the tubes is sufficiently great to prevent such rays from hitting the inner wall of the tube. The inner walls of the light conducting tube serve as an attenuator of light outside of this small angle because such light will hit the inner walls of the pipe.

Since light which hits the walls within each of the tubes 3 from outside this small segment of source 1 will be substantially attenuated or absorbed, only direct light rays from the source will completely pass down the tube and be detected; ambient or spurious light variations such as from a window or overhead light thus have no effect on the detectors. In addition, since the light conducting tubes in one preferred embodiment have an inside diameter of only 1/64" and are 6" long, it can be shown that each light passing tube 3 will completely pass direct light from only that longitudinal portion of fluorescent source which lies within the angle formed by straight lines from the inner circumference of the back of a tube 3 to the front of the tube. Thus if the spacing between source 1 and detectors 4 is 25', for example, each detector will receive light from approximately a target area on source 1 whose diameter measures 1.56 inches. Thus variations in length and diameter of tubes in addition to distance between the source and detectors results in changes in target area size, an ideal target size being approximately 1.5 inches, the diameter of a commercially available neon type light source.

Now while only one light conducting tube has been shown associated with each photoresistor, it will be appreciated that more than one such tube could be associated with each PR to increase the light level normally received by each PR. The preferred arrangement of other light conducting tube is to place them vertically above and below the light conducting tube shown. In this manner each photoresistor will receive light from a target area limited in the horizontal plane to the 1½ inch diameter of the source 1 but increased in the vertical plane to approximately 4" along the length of the tube. Thus by this modification as shown in FIGURE 1E fewer photoresistors are required to scan the whole length of source 1.

FIG. 1A shows the light detector assembly 2 in perspective to indicate the vertical arrangement of tubes 3 in front face 7. FIGURE 1C illustrates a staggered placement of the tubes 3, in front face 7 of the detector assembly. It will be obvious that the number of such light passing tubes is illustrative only since the number, spacing and other characteristics of these devices depend upon the particular application as will be discussed subsequently.

Figure 1B:
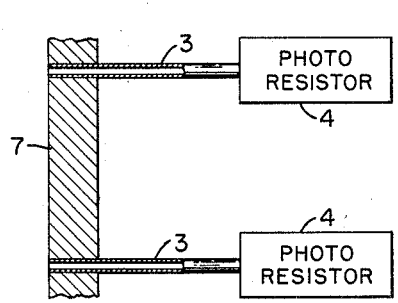
FIGS. 1B and 1D show, in partial cross section various modifications of the light conducting tube of the detector.

FIG. 1B is an enlarged partial cross section to show the relations of the light conducting tubes 3 to the photoresistors and the front face 7 of the detector assembly.

Figure 1D:
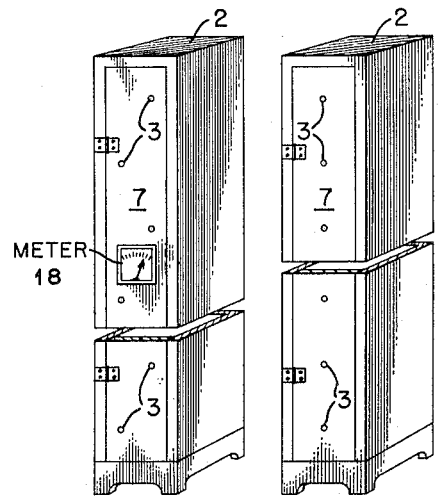
Figure 1D:
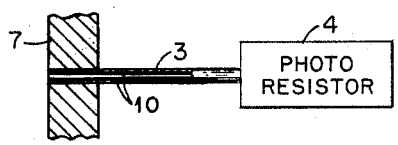
Figure 1E:
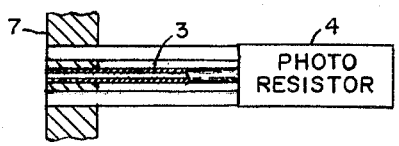
FIGS. 1A and 1C show two embodiments of the detector arrangements in perspective.

A still further modification is shown in FIG. 1D in which a radiation absorption liner or coating 10 of black paint, for example, is on the inside circumference of the tubes.

The operation of the disclosure, as so far described, is that the detectors will receive light from a solid curtain or plane of light which exists in the vertical plane containing both the tubes 3 and the fluorescent source 1. Each photoresistor will receive only that light which passes directly down its associated tube without hitting the walls. Thus each photoresistor receives light from a vertical portion or segment of source 1 based upon the angle formed by straight lines from the inside circumference of the tubes adjacent its photoresistor to the front of the tube and extended out to the fluorescent tube.

The purpose of the detectors is to completely detect light variations within the curtain and therefore to detect variations of light from any distinct segments of the whole fluorescent tube with a predetermined sensitivity while also being non-responsive to light outside of such curtain. If less sensitivity is permitted, fewer light conducting tubes having a larger diameter or having a larger spacing between 1 and 2 and fewer photoresistors may be used and vice versa if greater sensitivity is required.

The design factors which influence the selection of the respective values of tube diameter, length and number etc. are determined by the problems desired to be overcome as is discussed below.

Assuming the number of photoresistors is determined for the desired sensitivity and expense, then considering the distance between the light source and the detector as well as the height of the light source, then the tubes 3 and their associated photoresistors are spaced apart a distance equal to the height of the light source divided by the number of tubes. The diameter of the tubes 3 is then selected based upon their length so that light from one segment of the light source will pass unattenuated down the light tube while light from an adjacent segment of light source 1 will pass down the adjacent tube 3.

Problems with many systems are that light coming in a window during the daytime or from an overhead light may unbalance any conventional detection system; also an intruder may bring his own light source to forestall an alarm when he enters such a system. However, by the present invention light from the window or an overhead light and any other ambient or spurious light source will have no effect upon the detector scheme because such radiations will be attenuated within the tube.

Now referring more particularly to FIGS. 2–5, we will describe the several embodiments of electrical circuitry for connecting the detector apparatus of FIG. 1.

Figure 2:
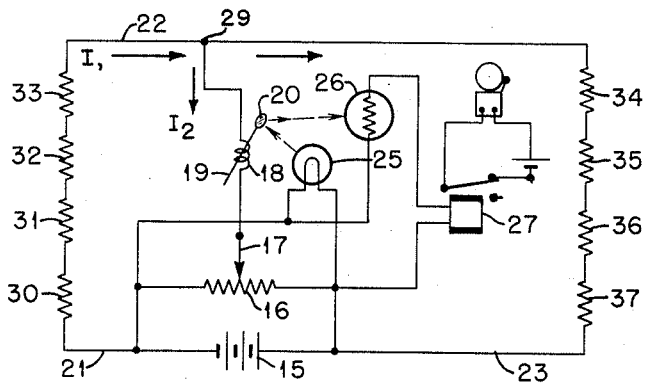

In FIG. 2 there is a source of power shown as battery 15 connected by lines 21, 22, and 23 in series with eight (8) photoresistors 31–37 for example which are physically displaced one above the other as shown at 4 in FIG. 1. Obviously there may be more or less photoresistors as desired. Photoresistors 30–33 will be positioned physically above 34–37. Tap 17 of potentiometer 16 is adjusted to slightly unbalance the bridge. Meter 18 which has a range of 0–15 microamperes will normally read 2–3 $\mu$a. and is referred to as active. Meter needle 19 will now swing to the left if photoresistor 33, for example, is darkened or to the right if 36, for example, is darkened. Since it is desired to operate relay 27 and ring the bell or other alarm as shown, current amplification of the meter current is obtained by the use of a reflective coating 20 on the meter needle.

Photoresistor 26 is positioned adjacent the meter needle so that in the normal condition (without intrusion) with the bridge slightly unbalanced, light from lamp 25 will reflect off coating 20 onto 26 thereby normally energizing (making active) the alarm relay 27. As the meter needle 19 moves either to the left or right as a result of intrusion the reflective path of light from the lamp 25 onto photoresistor 26 is interrupted increasing the resistance of the photoresistor and de-energizing alarm relay 27 to ring the bell as shown.

The circuitry of FIG. 2, as well as the other embodiments which will be subsequently described, has numerous advantages. For example if the 24 volt source 15 fails the alarm is sounded since relay 27 will be de-energized. However, any small variations in the voltage such as ripple from a rectified power supply or merely a decrease in voltage due to age of the battery are reflected equally at junction 29 and tap 17 so that the current through meter 18 does not vary. In the normal condition the current $I_1$ in FIG. 2, may be 150 microamperes and the current $I_2$ by appropriate selection of 16 may be only 2–3 microamperes. However, if greater sensitivity is desired the ratio of $I_2/I_1$ may be as great as 25%. Now if a large decrease in light intensity on all the photoresistors either because of a defect in the lamp source 1 or because of an intruder, $I_2$ decreases to substantially zero as does $I_1$ so that there is no reflection from 20 and alarm 27 is de-energized to operate the bell. Conversely a large increase in light intensity results in an increase in $I_1$ and $I_2$ to operate alarm.

If intrusion is made by only a small object as for example a fishing pole, the light beam, or at least a substantial portion of it, to one photoresistor will be interrupted so that not only does $I_1$ decrease substantially but the voltage at 29 changes substantially to operate the alarm.

Any ambient light such as from the windows or overhead light is largely attenuated by the light conducting tubes previously described. However, if an individual intruder brought his own light source of the same length and other characteristic as source 1 so that he illuminated all of the photoresistors equally giving him the benefit of all the known skill, he could not defeat this system because there would be a period in which even though all the PR's were illuminated there would be an increase or decrease in the normal illumination to one or more cells. That increase or decrease in the current $I_1$ acts to vary $I_2$ sufficiently to operate the alarm. For example, the meter needle 19 and its reflector 20 are designed to operate the relay for variations in meter current of only 1 microampere. Now if $I_2$ is 25% of $I_1$ then the alarm will be sounded for a 4 microampere variation of $I_1$. Since the photoresistors are about 20K ohm when illuminated, and 15 is 24 volts and $I_1$ is normally 150 microamperes, it is obvious that any slight variation in the light intensity will operate the alarm.

Figure 3:
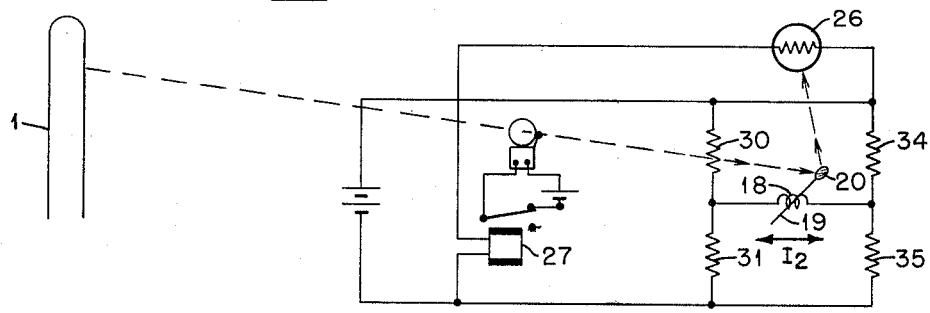

FIG. 3 shows another modification of my invention substantially the same as FIG. 2 with the exception that the bridge circuit has at least one detector photoresistor 30, 31, 34, and 35 in each arm of the bridge. Of course each arm of the bridge could have two, three, or more photoresistors although the number in each arm should be substantially the same. The bridge of FIG. 3 may be made slightly out of balance by inserting a small resistor (not shown) in one of the arms so that meter needle 19 is slightly off center as was discussed in reference to FIG. 2. This particular connection of the photoresistors in FIG. 3 has the advantages that the bridge is independent of both lamp and voltage variations. The independence of the bridge from such voltage and light source variations results from the fact that all four of the arms of the bridge are equally affected by such variations so that the meter 18 remains at its normal rest position and alarm 27 is not operated.

The lamp 25 shown in FIG. 2 has been eliminated in FIG. 3. Current amplification by the meter needle is still obtained by utilizing the light from lamp source 1 and reflecting this light off the meter needle as shown in dotted line in FIG. 3. The physical structure for such an arrangement is to place the current meter on the front panel of the detector as shown in FIG. 1C or alternatively to place the meter within the detector assembly 2 and place a light conducting tube in front of the needle in the same manner as the photoresistor assembly. FIG. 3 thus has all the advantages of FIG. 2 and in addition conserves the power of the battery by eliminating the separate light source 25.

Figure 4:
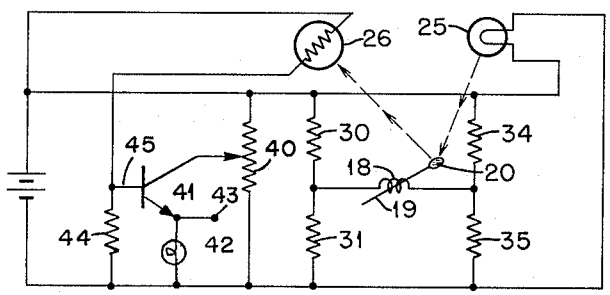

In the further detector circuit embodiment of FIG. 4, photoresistors 30, 31, 34, and 35 are shown in the four arms of the bridge. In addition, the meter 18 is shown connected between the arms of the bridge. Lamp 25 is shown for providing current amplification by reflection of light to photoresistor 26 although, it will be appreciated that this lamp may be omitted as discussed in reference to FIG. 3. Bleeder resistor 40 provides collector bias for the NPN transistor. The base 45 is connected to the junction of resistor 44 and photoresistor 26. Emitter 41 is connected through resistor 42 to the negative side of the battery; an output terminal is provided at 43. In normal operation the meter is active with a small current flow as discussed supra and light is reflected from 20 onto 26 so that the base 45 is positive and there is no output at 43. When intrusion occurs, the needle 19 is deflected, the impedance of 26 increases and the voltage at 45 goes negative to provide an output pulse at 43.

Figure 5:
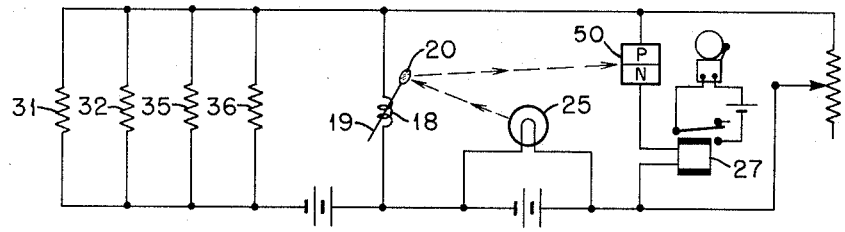
FIGS. 2–5 show several alternate schematic embodiments of the detector circuitry.

A still further embodiment of the detector circuit is shown in FIG. 5. Photoresistors 31, 32, 35 and 36 are in parallel. Relay 27 however is normally de-energized because of the back-biased PN junction diode and the light amplification also works differently from the previous embodiment in that the light from lamp 25 is normally not reflected from 20. However, when an intrusion occurs, reflection occurs at 20 onto the junction diode which thereby breaks down to energize the relay and sound the alarm.

There are several ways of obtaining current amplification by using the meter needle to control reflection of light onto a photoresistor 26 to operate alarm 27 as has been previously described. In general light was reflected from the meter needle onto a photoresistor in the slightly off balance condition of the bridge so that alarm relay 27 is normally energized. Numerous modifications of such current amplification system are possible to those skilled in the art. For example the alarm relay may be normally de-energized. Alternatively, the meter needle may have a hole in it and be placed directly above the photoresistor 26 so that in the balanced condition light passes through the hole onto 26 to normally energize relay 27.

While I have described several specific embodiments of my invention illustrating its novel aspects, those skilled in the art will appreciate that there are equivalents for the individual components and their connections and accordingly my invention is defined in the following claims.

I claim:

1. In a *security* protective system having an alarm, an elongated light source, and a plurality of light-sensitive detectors, the combination comprising a plurality of elongated light-conducting *tubes,* means for mounting and spacing said tubes substantially equal distances from each other in a plane including the tubes and the source with the elongated dimension of the tubes perpendicular to the elongated dimension of the source so that direct light rays from the source enter one end of said tubes and pass down the light-conducting tubes without attenuation, means for mounting said light-sensitive detectors on the other ends of the light-conducting tubes for receiving said conducted light, each of said tubes having a diameter and length for passing direct light from substantially different longitudinal segments of said source with adjacent tubes passing light from adjacent segments, and means including a Wheatstone bridge circuit for connecting said detectors for operating the alarm in response to a substantial variation in said light received by any one or all of the light-sensitive cells.

2. The combination as in claim 1 in which said light conducting tubes are hollow metal substantially 1/64 inch diameter and 6" in length.

3. The combination as in claim 1 in which the light conducting tubes have a diameter and length determined by the segmental target length of the light source which is equal to the length of the light source divided by the number of tubes and projecting this length from the light source to the light sensitive cells in an angle having its apex at those cells and in which the tangent of half of that angle is equal to the ratio of the diameter to the length of the pipe.

4. The combination as in claim 1 in which the means including a Wheatstone bridge circuit for connecting the detectors to operate the alarm include a current meter with a light reflecting needle responsive to variations in the light received by any one of the light sensitive cells, and a further light-sensitive means connected for controlling the alarm and arranged to receive light controlled by said needle.

5. A combination as in claim 4 in which said current meter is mounted adjacent said tubes for receiving light from said source.

6. A combination as in claim 1 in which said light-sensitive detectors are connected across a source of power in said Wheatstone bridge circuit, and further including a current meter connected between the output terminals of the bridge, further light-sensitive detector means, and means for reflecting light from the meter needle to said light sensitive detector further means for controlling the alarm.

7. A combination as in claim 6 further including means for mounting said current meter with its meter needle directly behind one of said light conducting tubes for receiving light from said source.

8. Apparatus for detecting intrusion comprising an elongated light source, at least four light sensitive detectors, a source of voltage, a Wheatstone bridge circuit connected across said source of voltage, said bridge circuit including said light sensitive detectors, in at least two legs of the bridge, at least four elongated light conducting tubes positioned in a plane including the light source with each tube affixed at one end to one of said detectors and with said tubes equally spaced in said plane for passing light from different segments of the light source to the individual light sensitive detectors, a single alarm relay connected across said voltage source, and means connected to the output terminals of said bridge circuit for controlling the operation of said relay upon interruption of the light to one or all of said light sensitive detectors whereby the alarm is sounded for any such interruption or by failure of said voltage source.

9. The improvement as in claim 8 in which said means connected to the output terminals includes a current meter having a light reflection needle; and in which said Wheatstone bridge includes a first series circuit including at least two light sensitive detectors connected across said source and a second series circuit including at least two other light sensitive detectors connected across said source; means connecting the current meter between the mid-points of said series circuits so that there is at least one light sensitive detector in each leg of the bridge.

10. The combination comprising an elongated light source, a multiplicity of photoresistors, elongated light conducting means connected to each photoresistor, each of said light-conducting means having one end for receiving light from said source and another end connected to its associated photoresistor, means for mounting all of said light conducting means substantially equally spaced from each other in a plane including the source with the elongated dimensions of the source and light conducting means perpendicular to each other so that direct light rays from different segments along the longitudinal dimension of the source pass down said one end of different light conducting means, a current meter having a current deflecting needle, said needle including a light reflecting coating, a source of power, means including said photoresistors and said source of power for providing a current through said meter and said photoresistors in which the current through the meter is greater than zero but less than 25% of the current through the photoresistors with all of the photoresistors in their normal illuminated state, and alarm control means for receiving light reflected from said meter needle reflector when said current is flowing in said meter.

11. The combination as in claim 10 in which all of the photoresistors are connected in a series circuit across the source of power to form two arms of a Wheatstone bridge, a potentiometer connected across the source of power to form the other two arms of the bridge, means for connecting the current meter between the mid-point of the series circuit and the adjustable tap of the potentiometer, said tap being adjusted to provide said meter current.

12. Apparatus as in claim 10 in which said photoresistors are connected in each of the four legs of a bridge circuit across a source of power to form two series circuits in parallel, and means for connecting the current meter between the mid-points of the series circuits.

13. Apparatus as in claim 10 in which said alarm control means includes a reverse biased junction diode.

14. Apparatus as in claim 10 in which said alarm control means includes a photodiode.

References Cited by the Examiner

UNITED STATES PATENTS

| | | | |
|---|---|---|---|
| 923,170 | 6/09 | Hawkins | 340—228 |
| 1,530,419 | 3/25 | Schmidt | 340—258 |
| 1,848,220 | 3/32 | Lindsay | 340—228 |

(Other references on following page)

UNITED STATES PATENTS

| | | | |
|---|---|---|---|
| 1,992,199 | 2/35 | FitzGerald | 340—228 |
| 2,037,191 | 4/36 | Backer | 340—38 |
| 2,242,317 | 5/41 | Metcalf | 340—258 |
| 2,302,271 | 11/42 | Smith | 340—258 |
| 2,315,978 | 4/43 | Moorefield | 317—127 |
| 2,360,885 | 10/44 | Metcalf | 340—258 |
| 2,438,825 | 3/48 | Roth. | |
| 2,816,283 | 12/57 | Steele | 340—228 |
| 2,900,521 | 8/59 | Eanes. | |
| 3,077,540 | 2/63 | Yager | 317—137 |

FOREIGN PATENTS

| | | |
|---|---|---|
| 437,205 | 10/35 | Great Britain. |
| 717,399 | 10/54 | Great Britain. |

NEIL C. READ, *Primary Examiner*.